Figure 1:
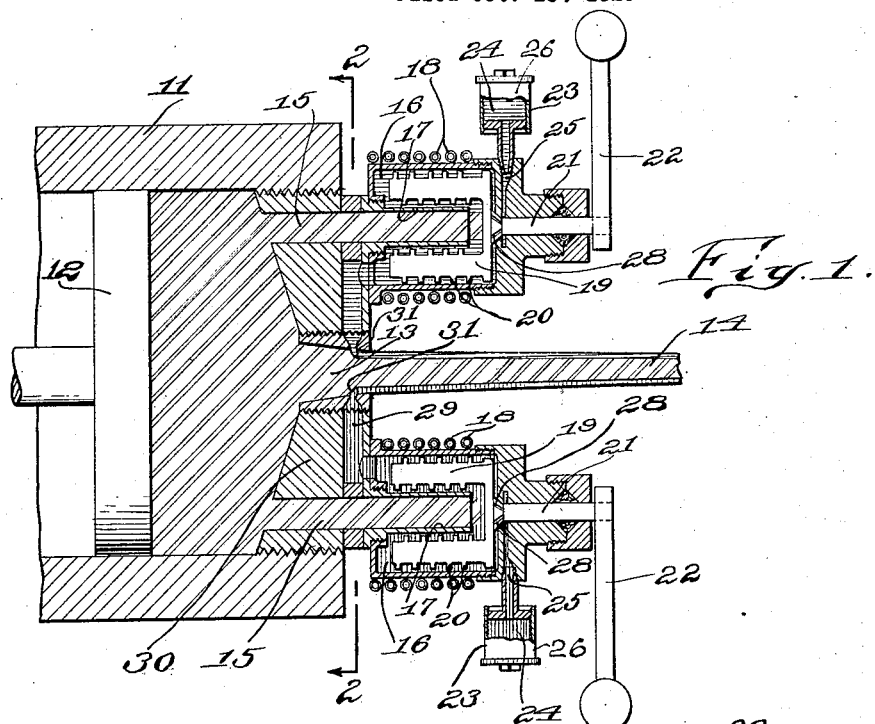

May 6, 1924.

W. B. LASKEY

MACHINE FOR FORMING AND STRIPING STICK CANDY

Filed Oct. 19, 1920

1,493,082

INVENTOR:
William B. Laskey
by Macleod, Calver, Copeland & Dike
Attys.

Patented May 6, 1924.

1,493,082

UNITED STATES PATENT OFFICE.

WILLIAM B. LASKEY, OF MARBLEHEAD, MASSACHUSETTS.

MACHINE FOR FORMING AND STRIPING STICK CANDY.

Application filed October 19, 1920. Serial No. 417,988.

*To all whom it may concern:*

Be it known that I, WILLIAM B. LASKEY, a citizen of the United States, residing at Marblehead, county of Essex, State of Massachusetts, have invented a certain new and useful Improvement in Machines for Forming and Striping Stick Candy, of which the following is a specification, reference being had therein to the accompanying drawings.

My invention has for its object a new and improved machine for making stick candy and for applying thereto one or more stripes of contrasting color. Heretofore, attempts have been made to produce a machine which will automatically stripe the sticks of candy as the sticks are produced, but for various reasons such machines have not been entirely satisfactory. The machine embodying my invention has an altogether new mode of operation. The candy is forced from a main cylinder through an orifice in a die to form a continuous strip of candy of cross-section somewhat greater than that of the finished stick. A portion of the candy in the main cylinder passes through a secondary orifice into a mixing chamber where it is heated and there mixed with the coloring material. From this chamber it passes through an orifice to a plough which cuts a groove in the side of the stick of candy and fills the groove with the striping material. The coloring material is automatically fed to the mixing chamber in proportions which may be varied by varying the speed of the feed of coloring matter. The entire operation of the machine is continuous and practically automatic.

The invention will be fully understood from the following description when taken in connection with the accompanying drawings, and the novel features thereof will be pointed out and clearly defined in the claims at the close of this specification.

In the drawings, I have shown the upper mixing chamber as filled with blue striping material and the lower chamber as filled with red striping material, the color being shown by cross hatching, but it will be understood that additional striping mechanism may be employed, and that the colors will be chosen according to the requirements of the candy maker.

In the drawings, Fig. 1 is an end view of the machine embodying my invention.

Figure 2:
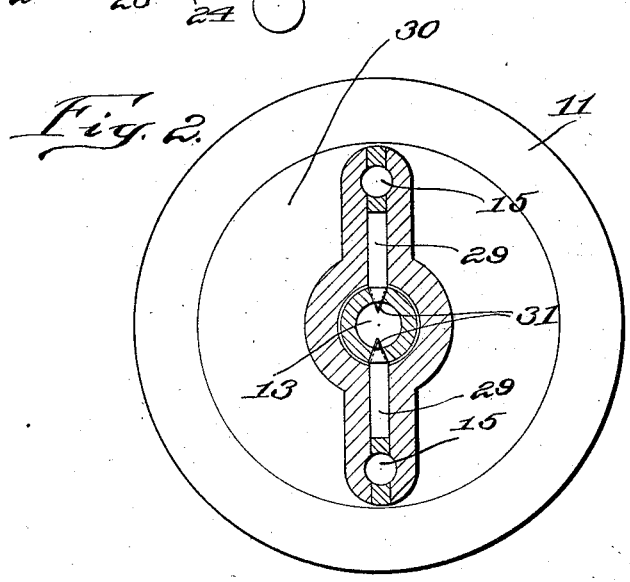

Fig. 2 is a section on line 2—2.

Referring now to the drawings, at 11 is shown the main cylinder of the machine and at 12 the main piston. The cylinder 11 is filled with warm pulled candy which will ordinarily be uncolored. This candy is pressed through the main orifice 13 to form a stick 14, the stick being pulled down somewhat in the well-known manner after leaving the orifice, this being for the purpose of reducing the diameter and imparting to the finished goods the highest possible luster or sheen.

One of the striping mechanisms will now be described:—It will be understood that as many striping mechanisms as may be required will be employed, but that they will all be of the same construction.

At 15 is shown a passage leading through the cylinder head 30 to a mixing chamber 16. The passage 15 enters the mixing chamber 16 through a tube 17 which extends nearly to the end of the mixing chamber 16 which is opposite the main cylinder 11. The inwardly extending open-ended tube 17 located in the mixing chamber gives it an annular shape. The mixing chamber is heated by heating pipes 18 containing steam. The candy which enters the mixing chamber 16 through the passage 15 is rendered much more plastic, or more nearly fluid, than the rest of the candy, and therefore is capable of being mixed more easily with the coloring matter and of being applied to the exterior of the sticks of candy.

Within the annular mixing chamber 16 is a rotary stirrer or beater 19 of any convenient shape, but preferably having paddles 20 to engage the candy. The stirrer 19 is mounted on an axle 21 and rotated by a crank 22.

At 23 is shown a container for the coloring matter, the coloring matter being designated 24. It passes from the container through a passage 25, the inner end of which surrounds the axle 21. The axle of the beater 19 is grooved to provide a plurality of small passages 28 through which the coloring matter may enter the mixing chamber 16. The coloring matter is forced into the mixing chamber by pressure produced by rotating the cover 26 of the container. This may be done automatically or by hand, and the container is so constructed that it can exert on the coloring matter a pressure greater than the pressure of the candy in the mixing chamber 16 so that it will be forced into the mixing chamber notwithstanding the pressure therein. The coloring matter enters the chamber at the end opposite the outlet passage 29 and is thoroughly mixed with the plastic or nearly fluid candy by the action of the beater 19 before it leaves the mixing chamber. The colored candy passes from the mixing chamber 16 through the outlet passage 29 which intercepts the main orifice 13 at a point just forward of the plough 31. The plough grooves the candy and the colored candy fills the groove formed by the plough.

From the foregoing, it will be seen that the pressure exerted by the piston 12 on the candy in the cylinder 11 forces the most of the candy through the main orifice 13, but that a small portion of it passes through the passage 15 into the mixing chamber 16. Since the pressure exerted on the coloring matter is greater than the pressure exerted on the candy in the mixing chamber 16, the coloring matter enters the mixing chamber and is rapidly and uniformly mixed with the plastic candy therein by the beater. The striping material is then forced out of the mixing chamber 16 through the passage 29 which leads to the plough 31, filling the groove formed in the stick of candy by the plough, and forming a stripe in the side of the stick. When the stick of candy is pulled down to give the necessary lustre, and the correct diameter, the stripe is diminished in width correspondingly.

What I claim is:—

1. In combination with a piston and cylinder to force the candy through an orifice in a die to form a stick, a mixing chamber connected with said cylinder by a passage, means for supplying coloring matter to candy in said chamber, a plough, and a passage connecting said mixing chamber and intercepting the main orifice at a point immediately behind the plough.

2. In a stick-candy machine, a piston and cylinder, the cylinder having a main orifice through which candy is forced to form a stick a mixing chamber supplied with candy from said cylinder, means for heating said mixing chamber, means for supplying coloring matter to the candy in said mixing chamber, a plough, and a passage connecting said mixing chamber and the main orifice at a point forward of said plough.

3. In a stick-candy machine, a piston and cylinder, the cylinder having a main orifice through which candy is forced to form a stick a mixing chamber supplied with candy from said cylinder, means for heating said mixing chamber, means for supplying coloring matter to the candy in said mixing chamber, stirring means in the said mixing chamber, a plough, and a passage connecting said mixing chamber and the main orifice at a point directly forward of said plough.

4. In combination with a piston and cylinder to force candy through a main orifice in a die to form a stick, a mixing chamber receiving candy from said cylinder, means for supplying coloring matter to the candy in said chamber at a pressure greater than that of the candy in the cylinder, and a passage leading from said chamber and intercepting said main orifice.

5. In combination with a piston and cylinder to force candy through a main orifice in a die to form a stick, a mixing chamber, means for forcing coloring matter into the chamber, there being passages connecting the cylinder, the coloring matter receptacle and the said main orifice, the passage which leads to the main orifice entering said mixing chamber at a distance from the points where the other two passages enter it.

6. In a machine of the character described, a mixing chamber which is annular in form and has an inwardly extending tubular passage open on its inner end, and a rotating stirrer operating in the annulus surrounding said central passage, an axle for said stirrer located opposite said central passage, there being an entrance passage for coloring material at the axle end, and an outlet passage at the opposite end of the device.

In testimony whereof I affix my signature.

WILLIAM B. LASKEY.